(12) United States Patent
Leegate et al.

(10) Patent No.: US 10,897,805 B2
(45) Date of Patent: Jan. 19, 2021

(54) SYSTEM, METHOD, AND APPARATUS FOR SYNCHRONIZING FLASHING IN A MARKER SYSTEM

(71) Applicant: ARCACHON HOLDINGS LLC, Clearwater, FL (US)

(72) Inventors: Gary Leegate, Clearwater, FL (US); Marcia Baldwin, Clearwater, FL (US)

(73) Assignee: ARCACHON HOLDINGS LLC, Clearwater, FL (US)

( * ) Notice: Subject to any disclaimer, the term of this patent is extended or adjusted under 35 U.S.C. 154(b) by 0 days.

(21) Appl. No.: 16/416,796

(22) Filed: May 20, 2019

(65) Prior Publication Data

US 2019/0274207 A1 Sep. 5, 2019

Related U.S. Application Data

(63) Continuation-in-part of application No. 15/901,505, filed on Feb. 21, 2018, which is a continuation-in-part of application No. 15/091,596, filed on Apr. 6, 2016, now abandoned.

(60) Provisional application No. 62/163,104, filed on May 18, 2015.

(51) Int. Cl.
| | |
|---|---|
| *H05B 47/19* | (2020.01) |
| *G01S 19/35* | (2010.01) |
| *A42B 3/04* | (2006.01) |
| *A42B 3/30* | (2006.01) |
| *G01S 19/18* | (2010.01) |

(52) U.S. Cl.
CPC ............. *H05B 47/19* (2020.01); *A42B 3/044* (2013.01); *A42B 3/046* (2013.01); *A42B 3/0433* (2013.01); *A42B 3/30* (2013.01); *G01S 19/18* (2013.01); *G01S 19/35* (2013.01)

(58) Field of Classification Search
CPC .............................. F21V 33/0076; F21L 4/084
See application file for complete search history.

(56) References Cited

U.S. PATENT DOCUMENTS

| | | | |
|---|---|---|---|
| 4,195,328 A | 3/1980 | Harris, Jr. | |
| 4,901,210 A * | 2/1990 | Hanabusa | A42B 3/044 2/422 |
| 5,414,405 A | 5/1995 | Hogg et al. | |
| 5,633,623 A | 5/1997 | Campman | |

(Continued)

FOREIGN PATENT DOCUMENTS

WO WO2009101391 A2 8/2009

OTHER PUBLICATIONS

Multi-Mission Marker Light, Helmet-Mounted, Helstar 4, Jun. 2007.

(Continued)

*Primary Examiner* — Thien M Le
*Assistant Examiner* — Asifa Habib
(74) *Attorney, Agent, or Firm* — Larson & Larson, P.A.; Frank Liebenow; Justin P. Miller

(57) ABSTRACT

A method of synchronizing flashing of a plurality of marker systems includes within each marker system of the plurality of marker systems, receiving a signal from at least one global positioning satellite, the signal comprising a time value. Then, when initiating illumination of at least one light emitting device of the marker systems, synchronizing of the initiating illumination to the time value.

16 Claims, 16 Drawing Sheets

(56) References Cited

U.S. PATENT DOCUMENTS

| | | | |
|---|---|---|---|
| 5,748,891 A * | 5/1998 | Fleming | G01S 1/045 342/132 |
| 5,966,226 A * | 10/1999 | Gerber | G01S 17/74 |
| 6,201,495 B1 * | 3/2001 | Lemelson et al. | 342/45 |
| 6,213,623 B1 | 4/2001 | Campman | |
| 6,283,620 B1 * | 9/2001 | Taylor | A42B 3/044 362/105 |
| 6,545,632 B1 * | 4/2003 | Lyons | G01S 7/021 342/13 |
| 7,021,790 B2 | 4/2006 | Parsons | |
| 7,023,004 B2 | 4/2006 | Ford et al. | |
| 7,221,263 B2 * | 5/2007 | Moore | B60Q 1/2676 340/427 |
| 7,315,036 B2 | 1/2008 | Ford et al. | |
| 7,505,279 B2 | 3/2009 | Ohtaki et al. | |
| 7,722,205 B2 | 5/2010 | Kim | |
| 7,831,150 B2 | 11/2010 | Roes et al. | |
| 8,444,291 B2 | 5/2013 | Swan et al. | |
| 8,477,492 B2 | 7/2013 | Rothkopf et al. | |
| 8,485,686 B2 | 7/2013 | Swan et al. | |
| 8,534,861 B2 | 9/2013 | Leegate et al. | |
| 8,573,797 B2 | 11/2013 | Spartano et al. | |
| 8,672,504 B2 | 3/2014 | Kramer | |
| 9,144,261 B2 | 9/2015 | Leegate et al. | |
| 9,175,837 B1 | 11/2015 | Leegate et al. | |
| 9,175,838 B1 | 11/2015 | Leegate et al. | |
| 9,341,714 B2 | 5/2016 | Leegate et al. | |
| 9,476,982 B2 | 10/2016 | Leegate et al. | |
| 9,746,561 B2 * | 8/2017 | Leegate | A42B 3/0433 |
| 2008/0134562 A1 * | 6/2008 | Teetzel | F41G 11/003 42/146 |
| 2008/0216699 A1 | 9/2008 | McAleer et al. | |
| 2009/0144872 A1 * | 6/2009 | Lebel | A42B 3/221 2/6.7 |
| 2010/0128468 A1 | 5/2010 | Ong et al. | |
| 2011/0170280 A1 | 7/2011 | Soto | |
| 2013/0114275 A1 * | 5/2013 | Cristoforo | A42B 3/044 362/396 |
| 2016/0088891 A1 * | 3/2016 | Walsh | A42B 3/04 2/421 |
| 2016/0309826 A1 * | 10/2016 | Anderson | A42B 3/0453 |

OTHER PUBLICATIONS

Marker Light, Three-Function (Helmet-Mounted), Helstar 5, May 25, 2010.

Marker Light, Two-Function (Helmet-Mounted), Helst Ar 4® 3EN IV, Oct. 30, 2011.

Marker Light, Two-Function (Helmet-Mounted), Hel Star 4® 3EN IV, May 9, 2012.

Marker Light, Three-Function (Helmet-Mounted), Hel Star 5®, May 9, 2012.

* cited by examiner

SYSTEM, METHOD, AND APPARATUS FOR SYNCHRONIZING FLASHING IN A MARKER SYSTEM

CROSS-REFERENCE TO RELATED APPLICATION

This application is related to U.S. Pat. No. 9,144,261 (issued Sep. 29, 2015), U.S. Pat. No. 9,175,837 (issued Nov. 3, 2015), U.S. Pat. No. 8,534,861 (issued Sep. 17, 2013), and U.S. Pat. No. 9,175,838 (issued Nov. 3, 2015), and U.S. Pat. No. 9,341,714 (issued May 17, 2016), U.S. Pat. No. 9,476,982 (issued Oct. 25, 2016) and U.S. Pat. No. 9,746,561 (issued Aug. 29, 2017). This application is a continuation-in-part of U.S. patent application Ser. No. 15/901,505 filed Feb. 2, 2018 which is a continuation-in-part of U.S. patent application Ser. No. 15/091,596 filed Apr. 6, 2016, which takes priority from 62/163,104 filed May 18, 2015. The disclosures of each of the above are hereby incorporated by reference.

FIELD

This invention relates to the field of military lighting and more particularly to a system for synchronizing flashing between several helmet marking systems.

BACKGROUND

Many helmets are equipped with marking systems (markers) that provide steady or flashing emissions in order to provide visibility of the wearer to co-combatants for identification and battlefield command and control. Often flashing signals are random, and in the case of multiple co-combatants such flashing signals can be incoherent, confusing, distracting, and sometimes confused with muzzle flash from gunfire.

Helmet-mounted marking systems can also be augmented to provide the wearer with alerts relating to identification-friend-or-foe (IFF) interrogations by infrared lasers and simultaneous visual signals to the interrogating co-combatant that the helmet wearer is a "Friendly". Upon an IFF interrogation, (1) the IFF-enabled helmet-mounted marker sends a haptic alert to the wearer via a cable and vibratory pad connected to the helmet-mounted marker and routed inside the helmet, and (2) the helmet-mounted marker emits a user-specified coded signal visible to the interrogating co-combatant identifying the helmet-wearer as a "Friendly," to help prevent fratricide. In cases where an IFF interrogation may be simultaneously received by more than one co-combatant, the visual coded flash back to the interrogator identifying the interrogated co-combatants as "Friendly" can be synchronized to provide further visual confirmation that the interrogated combatants are "Friendly".

Some military helmets are provided with mechanical attachment fitting means or "rails" often on the left and right sides of the helmet, such rails intended to provide secure attachment for other helmet-mounted equipment such as flashlights, helmet-mounted marker systems, and radio communication gear. In some cases, these rails include a means to transmit power to rail-connected devices from a helmet-mounted battery pack or a battery pack mounted on or otherwise carried by the helmet wearer. In some cases, these helmet-mounted mechanical attachment means also include connections which allow the transmission of data to equipment interconnected with the power/data rail.

Some equipment worn by a combatant either on the helmet or otherwise mounted or carried by the combatant such as helmet-mounted battery packs and wrist or chest-mounted tactical computers include satellite global positioning system (GPS) receivers used to establish and process such data relating to the combatant as location, direction, movement speed and time anywhere in the world.

Without synchronization of flashing signals or synchronized IFF interrogation responses of helmet-mounted personnel markers, such flashing signals are non-coherent, confusing, distracting, and are not easily distinguished from other flashing signals on the battlefield such as non-team members, enemy combatants, or muzzle flash from gunfire.

What is needed is a method to synchronized timing of marker system flashing using, for example, GPS timing signals.

SUMMARY

In one embodiment, a marker system is disclosed including a controller and a plurality of emitters electrically interfaced to the controller such that, upon the controller initiating a flow of electric current though one or more of the emitters, the one or more of the emitters emit visible and/or infrared light. There is also at least one detector electrically interfaced to the controller, the at least one detector for detecting light in of a specific wavelength and converting the light to an electrical signal that is received by the controller. A radio frequency receiver is interfaced to the controller and receives a radio frequency signal from one or more global positioning satellites and decodes a time value from the signal. The controller selectively initiates the flow of electric current through a selected set of the plurality of emitters synchronized to the time value.

In another embodiment, a method of synchronizing flashing of a plurality of marker systems includes each marker system of the plurality of marker systems receiving a signal from at least one global positioning satellite, the signal comprising a time value. Then, when initiating illumination of at least one light emitting device of each of the plurality of marker systems, the initiating of illumination of the plurality of marker system is synchronized to the same time value provided by the global positioning satellite to each of the marker systems.

In another embodiment, a marker system is disclosed including a housing that has at least one translucent or transparent surface. A controller is mounted within the housing along with a plurality of emitters. The plurality of emitters is electrically interfaced to the controller such that, upon the controller initiating a flow of electric current though one or more of the emitters, the one or more of the emitters emit light and the light passes through the at least one translucent or transparent surface. There is also at least one detector electrically interfaced to the controller, the at least one detector for detecting light in of a specific wavelength and converting the light to an electrical signal that is received by the controller. A radio frequency receiver is interfaced to the controller. The radio frequency receiver receives a radio frequency signal from one or more global positioning satellites and decodes a time value from the signal, then software stored in a non-transitory storage associated with the controller initiates the flow of electric current through a selected set of the plurality of emitters synchronized to the time value.

In another embodiment, a simple GPS receiver system is installed within the helmet-mounted marker system. When a flashing emission function is selected by one or more helmet wearers on their respective helmet-mounted marker system, the integral GPS receiver coupled with the electronic circuits in the marker systems initiates the flashing emission function precisely at the start of the next second of time as acquired by the GPS receiver. If, for instance, the flashing function selected by the user is 60 flashes per minute, the flash sequence will start at exactly the top of the next second and flash at the top of every subsequent second (e.g., 21:03.58:000, 21:03:59:000, 21:04:00:000, 21:04:01:000 . . . , where for instance the time might be expressed in hours:minutes:seconds:milliseconds). Whenever other helmet-wears select the same flashing function on their helmet-mounted markers, those flash emissions will also synchronize to the GPS time value received by each helmet-mounted marker system. If, for instance, the flashing function selected by the helmet-wearers is 30 flashes per minute, the flashes of all helmet-mounted markers could synchronize on the precise top of every other second of each minute (e.g., 21:03:58:000, 21:04:00:000, 21:04:02:000, 21:04:04:000 . . . ).

In another embodiment, the helmet-mounted marker is connected directly to another electronic device that has a GPS receiver. Examples of such electronic devices include a heads-up display mounted on the helmet, a separate battery pack mounted on the helmet, and or a wrist- or body-mounted tactical computer. The helmet-mounted marker is configured to receive and process time values directly from the electronic device, from the GPS receiver. The synchronization of user-selected flashing functions on the helmet-mounted marker is the same as before, the only difference being the source of the GPS timing data.

In another embodiment a helmet-mounted marking system is connected for power and data via a cable and connector which interfaces directly with a power/data rail system set up to transmit power and data. The power/data rail transfers data from another electronic device that includes a GPS receiver that is mounted on the helmet or carried by the combatant. In this embodiment, the helmet-mounted marker is connected to the power/data rail in such a way as to receive and process a time value from the electronic device that includes a GPS receiver through the data interconnection of the power/data rail. The synchronization of user-selected flashing functions on the helmet-mounted marker is the same as before, the only difference being the source of the GPS time value.

In another embodiment, whether the actual GPS signal reception is made by a GPS receiver in the helmet-mounted marker or in other equipment mounted on or carried by the soldier, the GPS-enabled helmet-mounted marker includes a timing regulation circuit which will maintain the GPS timing with reasonable accuracy during any period when the GPS receiver is not in communication with the GPS satellites, such as when combat operations are being carried out indoors.

In another embodiment, the GPS time value and power are provided to the helmet-mounted marker system from an electronic device the includes a GPS receiver. The electronic device is carried by the combatant or mounted on the combatant's helmet or other gear. The GPS time value and power are provided wirelessly to the marker via a power/data inductive transfer system consisting of a power/data transmitting coil mounted on the helmet and provided with sources of power and data and a power/data receiving coil mounted on or in the marker providing the power and data (e.g. time value) to the marker.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
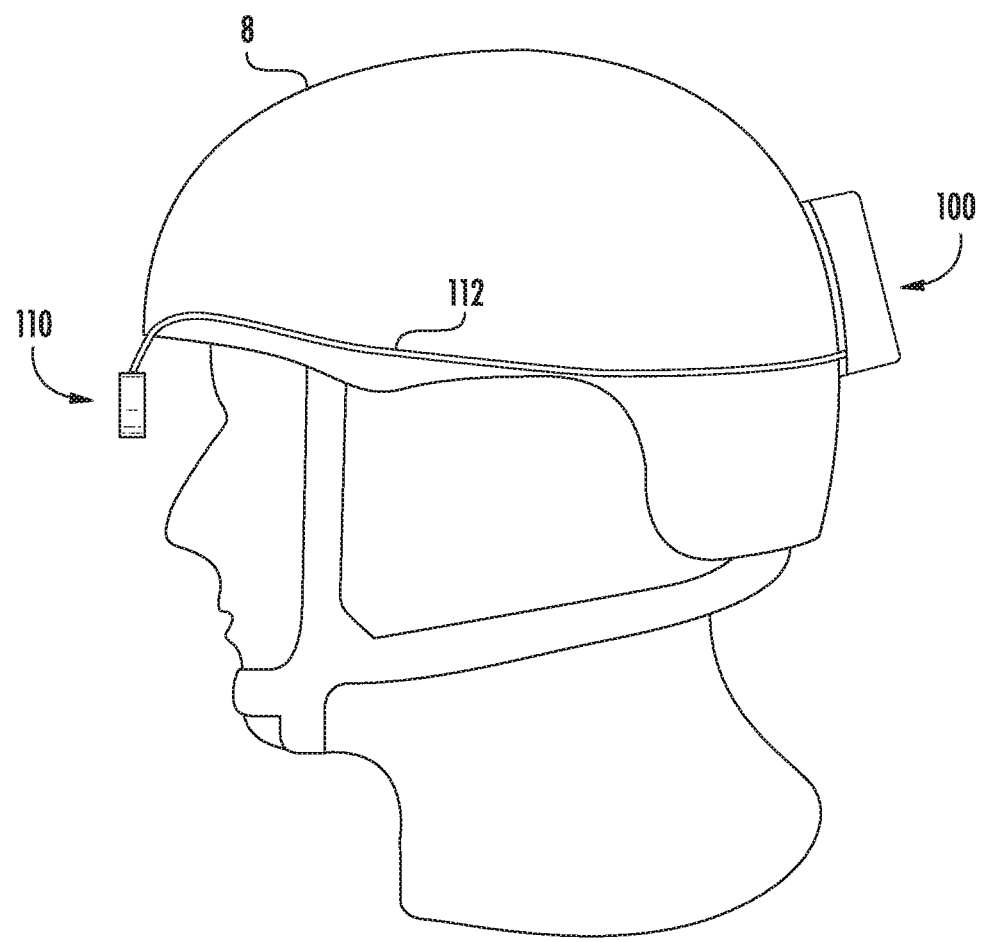
FIG. 1 illustrates a view of a helmet of the prior art with an attached power source.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a view of a helmet 8 of the prior art with a power source 100 for providing power is shown, for example, for providing power to a heads-up display. Many helmets 8 are known to have some sort of indicator 110 such as a heads-up-display or a set of one or more LEDs to convey information to the wearer of the helmet 8. In some embodiments, the indicator 110 is a heads-up display showing images, video, and/or text of various activities such as other troops, enemy operations, aircraft locations, enemy equipment operations, maps, etc. In some embodiments, the indicator 110 is a set of LEDs used to indicate certain activities such as combatants being nearby or when to advance and when to retreat.

No matter what the indicator 110 is or what it is used for, or for that matter, whatever device is connected to or integrated into the helmet 8, the indicator 110 or other devices require power to operate. As shown in FIG. 1, the power (an optionally control and data signals) comes from a power source 100 that is typically mounted to the helmet 8, often being mounted on a back surface of the helmet 8. Connection between the indicator 110 and the power source 100 is by an indicator cable 112.

In some embodiments, the power source 100 includes a primary battery that is replaced, typically before each mission. In some embodiments, the power source 100 includes a rechargeable battery that is recharged, typically, before each mission. Any source of power is known and included herein.

Figure 2:
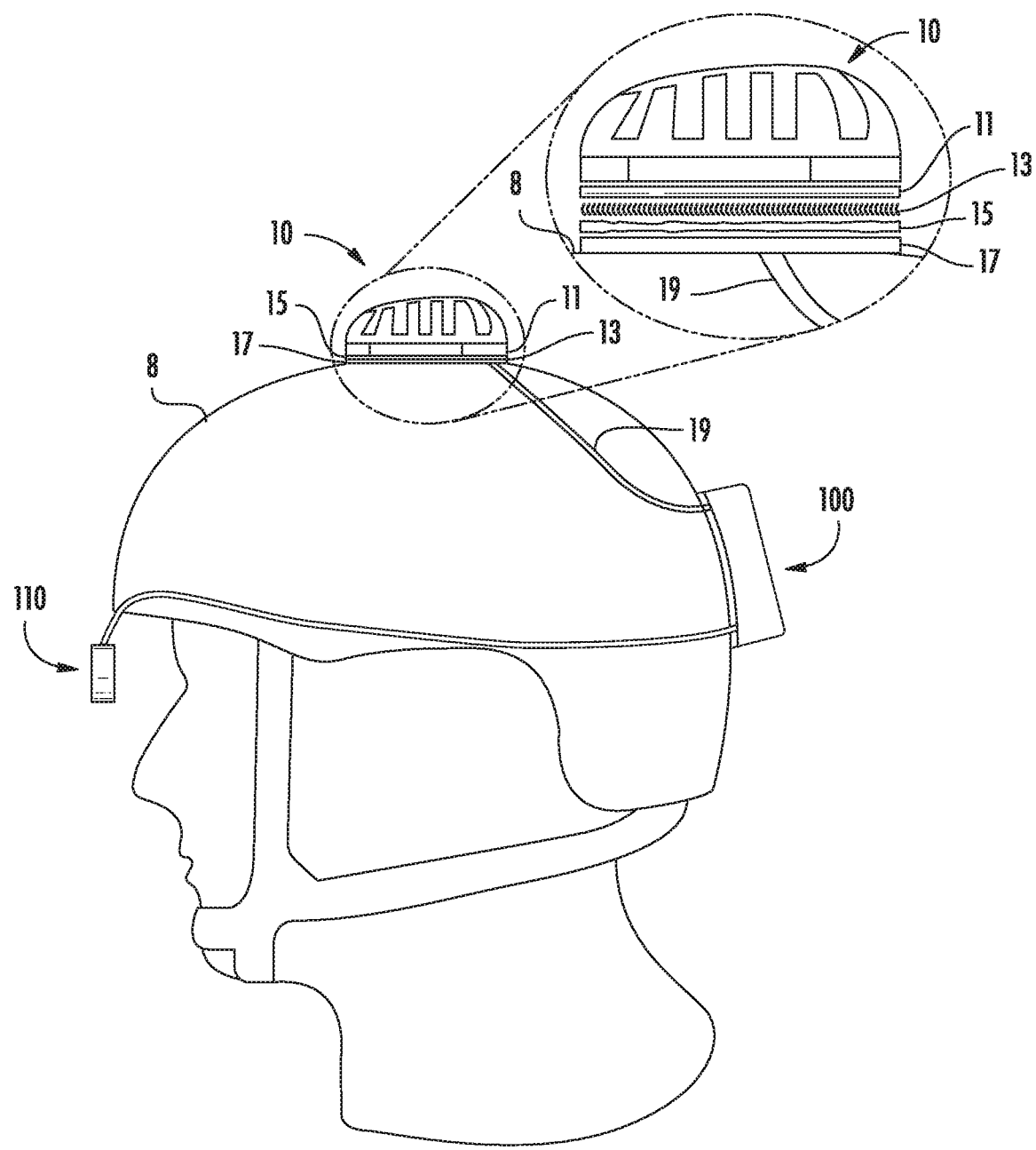
FIG. 2 illustrates a view of the helmet with a marker system deriving power from the attached power source through a power/data inductive transfer system.

Referring to FIG. 2, a view of the helmet 8 (as in FIG. 1) with a marker system 10 deriving power from the power source 100 is shown. To reduce the probability of the wearer 1 having one good battery and one weak battery, it is best to eliminate all batteries except for one battery, therefore requiring that only one battery be maintained. In prior systems, each device (e.g. the marker system 10 and the indicator 110 system) had separate and independent power sources (e.g. separate batteries) and the wearer was in the position of making sure both (or all) batteries were fully charged before a mission.

In FIG. 2, the need to charge/recharge the marker system 10 through a direct wired connection to a power source is eliminated or reduced by providing electrical power through a wireless interface to the marker system. A wireless interface is used as a power (and optionally data) interface in lieu of an electrical contact interface which is prone to failure due to contact erosion or deposits caused by the environment in which the helmet 8 and electrical components are used. In FIG. 2, the power/data receiving coil 11 and the power/data transmitting coil 17 are visible from the side. The marker system 10 has a power/data receiving coil 11 and the helmet 8 has a power/data transmitting coil 17. The power/data transmitting coil 17 is connected to the power source 100 (and control circuit) through a power cable 19. Since the marker system 10 is typically removably attached to the helmet 8, hook and loop material 13/15 are shown between the power/data receiving coil 11 and the power/data transmitting coil 17. When the marker system 10 is attached to the helmet 8 (e.g. by way of the hook and loop material 13/15), the power/data transmitting coil 17 is energized by an alternating or pulsed frequency that creates a magnetic field around both the power/data transmitting coil 17 and the power/data receiving coil 11, causing current to flow in the power/data receiving coil 11 that is conditioned and optionally stored within the marker system 10. As the marker system 10 often emits pulses of light energy, instantaneous power requirements vary with the amount of light energy needed and, therefore, in most embodiments, the energy received from the power/data receiving coil 11 is often stored in a power storage device 202 (see FIGS. 10, 10A, 10B, 10C) such as a rechargeable battery or a capacitor that is internal to the marker system 10.

In some embodiments, the power/data transmitting coil 17 and the power/data receiving coil 11 are air-wound while in other embodiments, either or both of the power/data transmitting coil 17 and the power/data receiving coil 11 have magnetic cores (e.g. magnetic cores made of iron or powdered iron) as the magnetic core has the ability to improve power transfer efficiencies. Also, in some embodiments, the driver circuit is tuned and/or adjusted to provide an optimum alternating current or pulsed current frequency given an impedance of the power/data transmitting coil 17. In such, the power/data receiving coil 11 and the power/communications driver 104 are preferably tuned to optimize reception of power at that frequency and, thereby, providing optimal power transfer between the power source 100 and the marker system 10.

Figure 3:
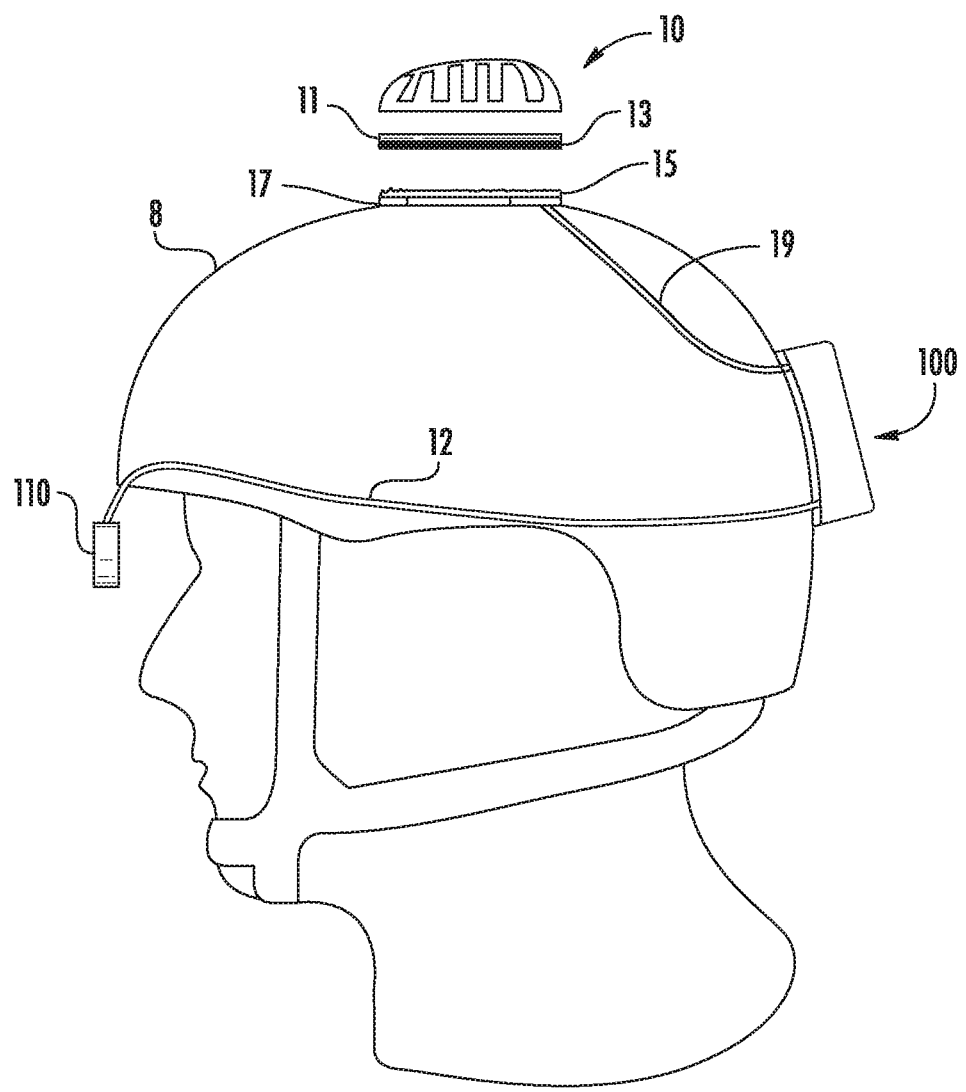
FIG. 3 illustrates a view of the helmet with the marker system lifted from the helmet showing elements of the power/data inductive transfer system.

Referring to FIG. 3, a view of the helmet with the marker system 10 lifted from the helmet 8 is shown. In many embodiments, the marker system 10 is removable from the helmet 8 for maintenance, reprogramming, etc. In such, the marker system 10 is removably attached to the helmet 8 by any way known, one of which is by providing one type of hook and loop material 13 attached to the marker system 10 and the mating type of hook and loop material 15 to the helmet 8. In such, the power/data transmitting coil 17 and the power/data receiving coil 11 are spaced apart from each other by the one type of hook and loop material 13 and the mating type of hook and loop material 15, though closer spacing is possible by having the one type of hook and loop material 13 around a periphery of the marker system 10 and the mating type of hook and loop material 15 arranged in a similar fashion on the surface of the helmet 8 and having one or both of the power/data transmitting coil 17 and the power/data receiving coil 11 set-off from respective surfaces of the marker system 10 and the surface of the helmet 8.

Figure 4:
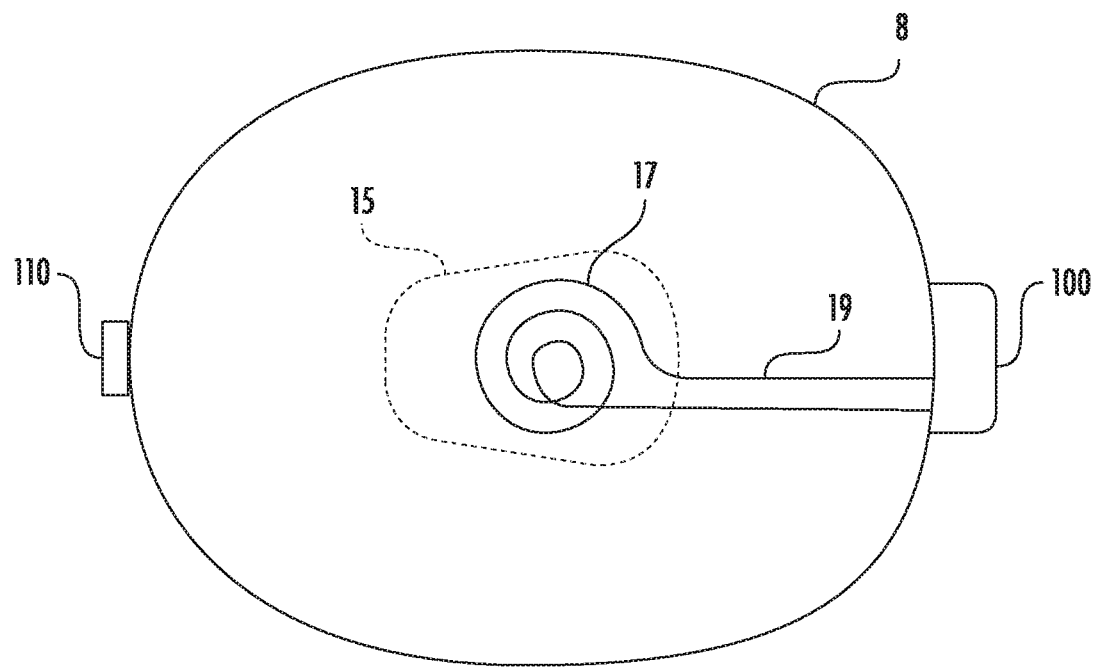
FIG. 4 illustrates a view of the helmet side of the power/data transfer system showing the power/data transmitting coil.

Referring to FIG. 4, a top view of the helmet side of the power transfer system is shown. In this, the power/data transmitting coil 17 is shown connected to the power source 100 (and power/communications driver 104—see FIG. 9) by a power cable 19. The one-type of hook and loop material 15 is shown as an example.

Figure 5:
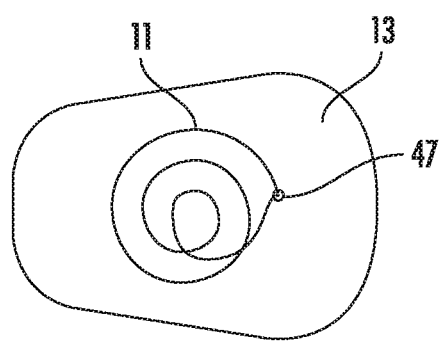
FIG. 5 illustrates a view of the marker system side of the power/data transfer system.

Referring to FIG. 5, a bottom view of the marker system 10 is shown. The marker system 10 has a power/data receiving coil 11 located to align with the power/data transmitting coil 17 of the helmet 8 when the marker system 10 is held to the helmet 8 by, for example, the one-type of hook and loop material 15 of the helmet 8 and the mating type of hook and loop material 13 of the marker system 10. In embodiments in which the power/data receiving coil 11 is located external to the enclosure of the marker system 10, a through-hole 47 provides a path for the wires of the power/data receiving coil 11 to enter into the marker system 10. It is anticipated that the through-hole 47 is sealed after the wires are installed to maintain a water-tight enclosure for the marker system 10.

Figure 6:
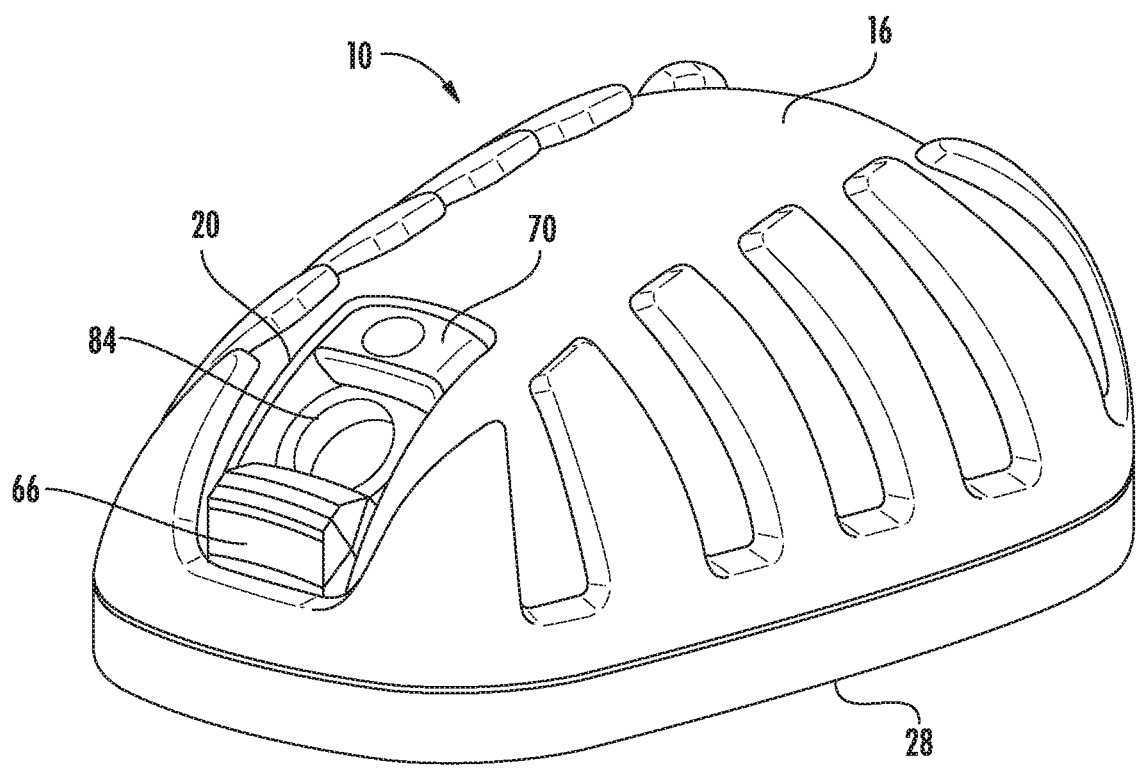
FIG. 6 illustrates a perspective view of the marker system.
Figure 7:
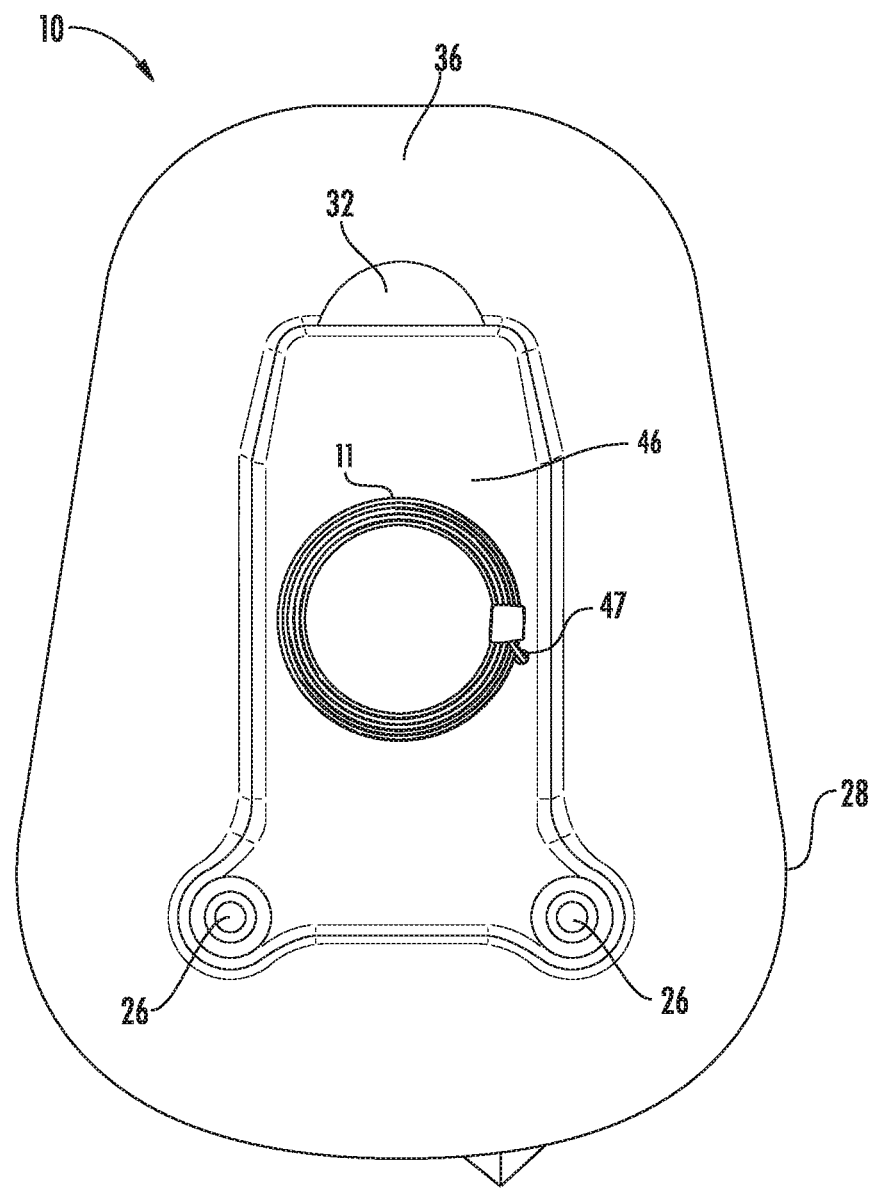
FIG. 7 illustrates a bottom view of the marker system.

Referring to FIGS. 6 and 7, a perspective view and a bottom view of the marker system 10 is shown. For completeness, a marker system 10 is shown as an example having a bottom enclosure 28 that is connected to a top enclosure 16 (e.g. by screws, an ultrasonic weld, or adhesive), sealing the marker system 10. The top enclosure 16 and, optionally the bottom enclosure 28 are translucent or transparent, thereby allowing light radiation in/out as needed for signaling and/or visibility purposes. Various controls 20/84/66 are employed for the wearer to control the marker system 10, preferably without any need to look at the marker system 10 as the marker system is typically mounted on the helmet 8 that is worn by the wearer and operated by hand-manipulation of the various controls in the blind, out of sight of the wearer.

In FIG. 7, the bottom surface of the bottom enclosure 28 is shown. In some embodiments, the marker system 10 includes power storage device 202. Although, in some embodiments, it is anticipated that the power storage device 202 (see FIG. 10) that is removable through a door 32 while in other embodiments, the bottom enclosure 28 is sealed, having the power/data receiving coil 11 located as close to the bottom surface of the bottom enclosure 28 as possible to maximize power transfer efficiency between the power/data transmitting coil 17 and the power/data receiving coil 11.

Figure 8:
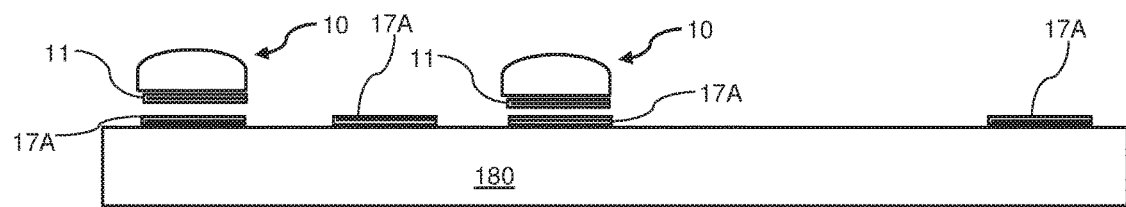
FIG. 8 illustrates a multiple marker system charger of the power transfer system.

Referring to FIG. 8, a marker system charger 180 of the power transfer system is shown. As, in some embodiments, each marker system 10 has a power storage device 202 (see FIG. 10), it is anticipated that, is some embodiments, there are marker system chargers 180 (e.g. external to the helmet 8) for charging one or more marker system(s) 10 that are removed from the helmet 8. This example, a marker system charger 180 has multiple charging locations, each having a charging station power/data transmitting coil 17A for transmitting power (and optionally data) to the power/data receiving coil 11 of each marker system 10. Note that although multiple charging locations are shown, in some embodiments, the marker system charger 180 has a single charging location.

Figure 9:
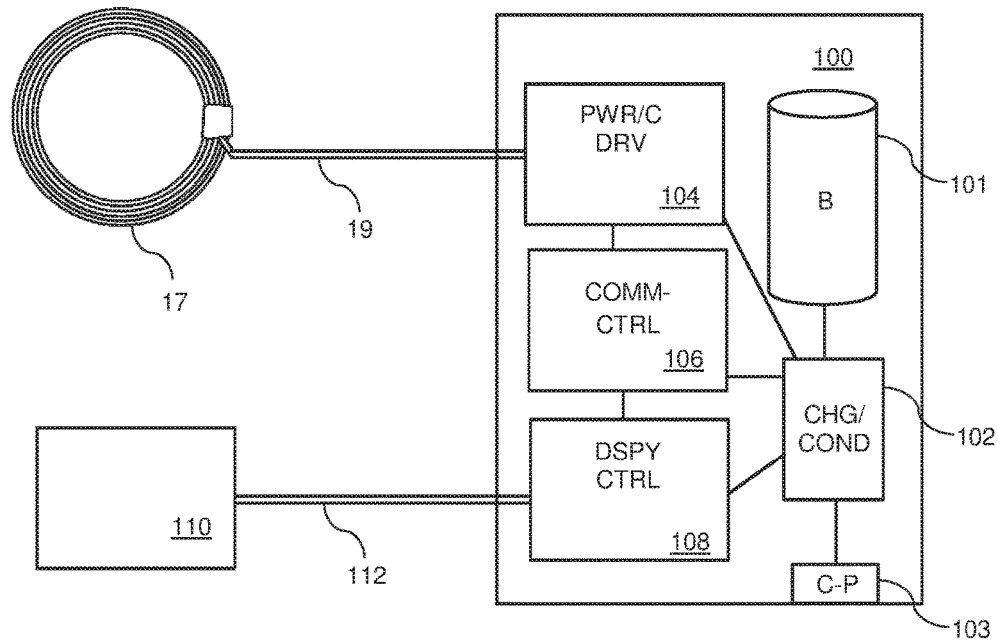
FIG. 9 illustrates a schematic view of the helmet side of the power/data transfer system.

Referring to FIG. 9, a schematic view of the helmet side of the power transfer system is shown (or the marker system charger 180). Note that the locations and details of the various subcomponents are shown as an example and other configurations are equally anticipated.

In the example of FIG. 9, the power source 100 has a power storage device 101 such as a battery (e.g. removable), a rechargeable battery (removable or fixed), a super capacitor, etc. In embodiments in which the power storage device 101 is rechargeable, a charge and power conditioning circuit 102 controls the charging as power to the charge and power conditioning circuit 102 is received from a charge port 103 (e.g. a connector such as a micro-USB connector).

Power from the power storage device 101 is regulated, converted, and conditioned as needed by the charge and power conditioning circuit 102 and delivered to the other electronic circuits, for example, to the power/communications driver 104, communications and, in this example, control module 106 and the display controller 108.

The display controller 108 receives information from the communications and control module 106 (e.g., information to display) and controls the indicator 110 (e.g. LEDs or graphics display) through the indicator cable 112 to display the information that is received.

The power/communications driver 104 receives power and/or data from the charge and power conditioning circuit 102 and drives the power/data transmitting coil 17 with the appropriate voltage and frequency, connected through a power cable 19. This creates an electromagnetic field around the power/data transmitting coil 17. In some embodiments, the power/communications driver 104 also receives information from the communications and control module 106 and modulates that information across the power/data transmitting coil 17 for communicating with the power/data receiving coil 11 which is positioned within the electromagnetic field, and hence, data is transferred to/from the marker system 10.

Figure 10:
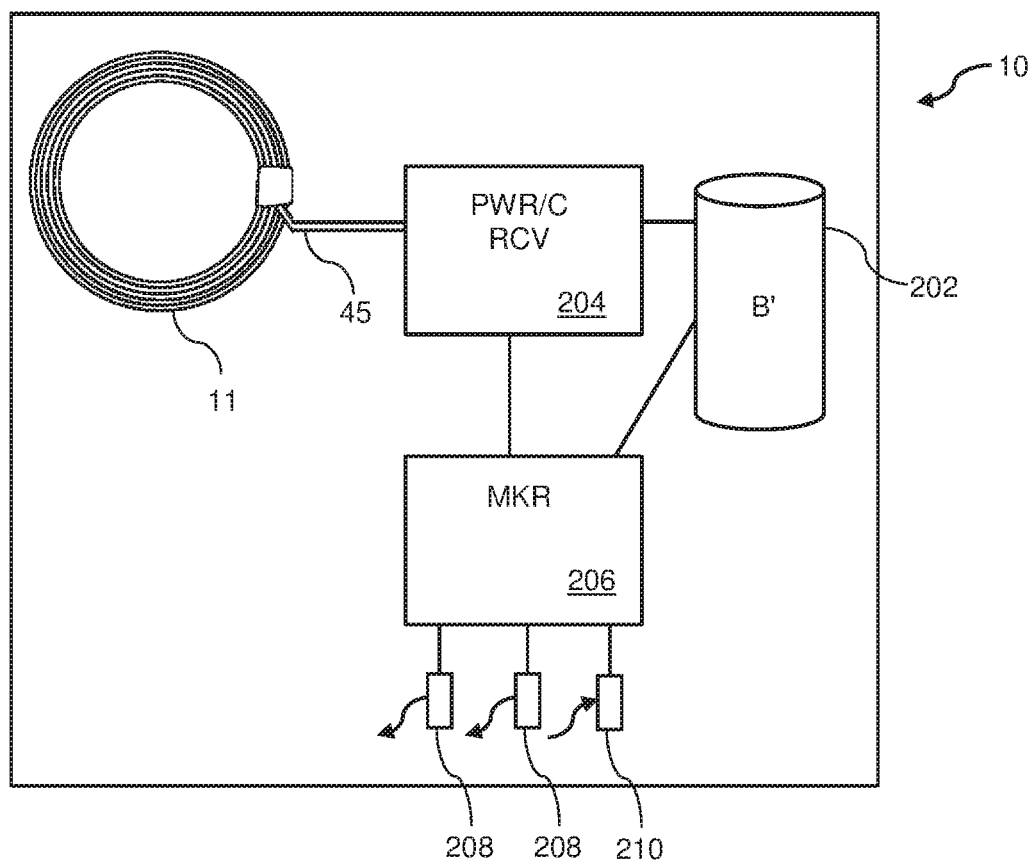
FIGS. 10, 10A, 10B, and 10C illustrate schematic views of the helmet side of the power/data transfer system of the synchronized flashing system.
Figure 10A:
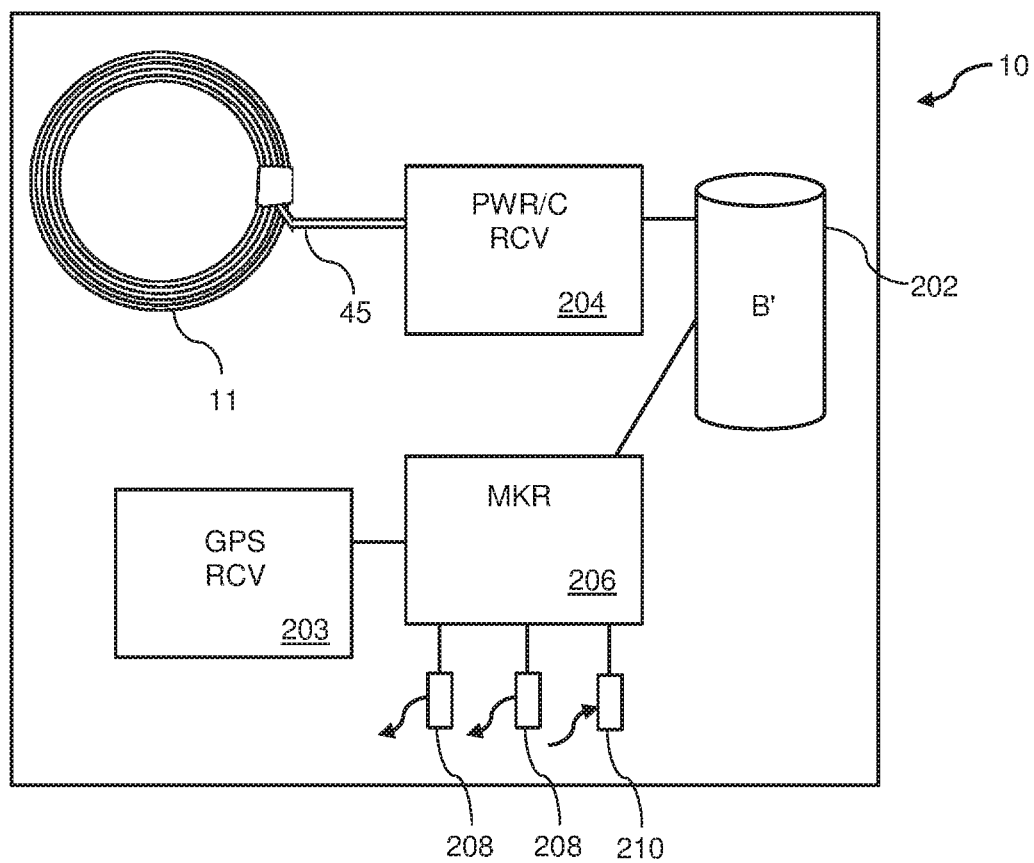
Figure 10B:
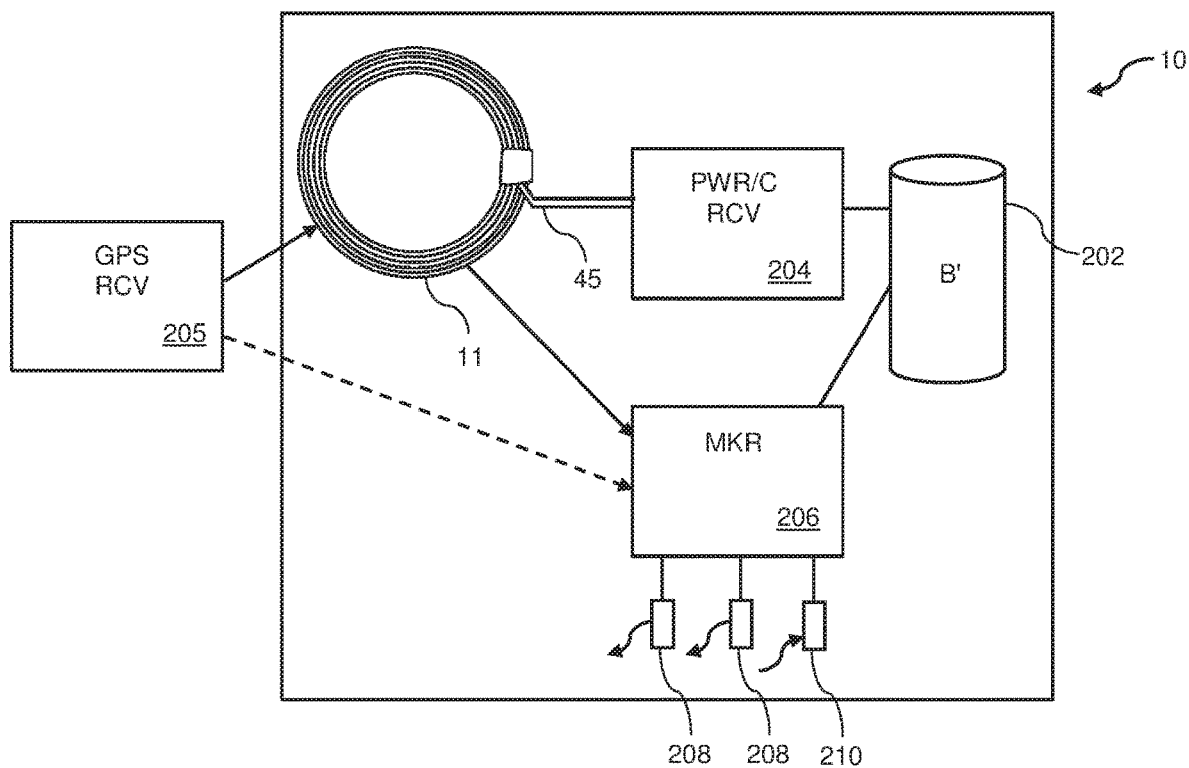
Figure 10C:
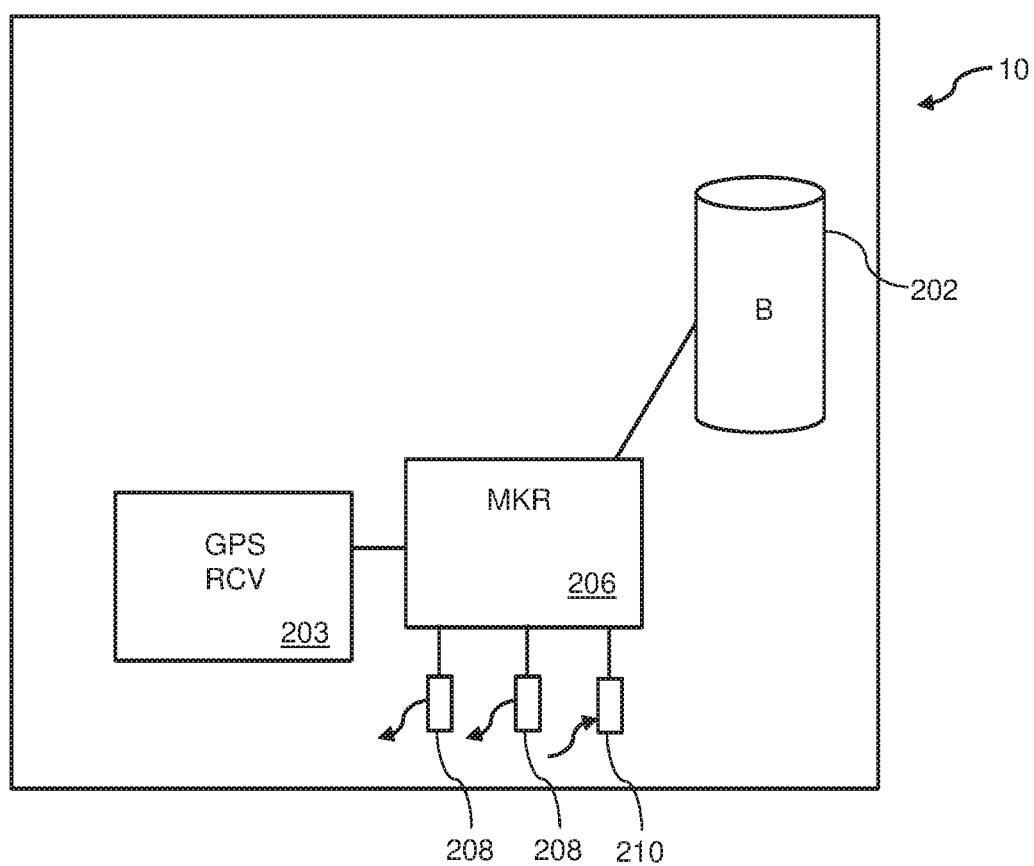

Referring to FIGS. 10, 10A, 10B, and 10C, schematic views of the helmet side of the flash synchronization system are shown. In FIG. 10, only the power reception system of the marker system 10 is shown, while in FIG. 10A, an internal GPS receiver 203 is included in the marker system 10. In FIG. 10B, an external GPS receiver 205 is provided in another electronic device (not shown for clarity) and data from the external GPS (e.g. the time value from the global positioning satellite) is transferred into the marker system 10 either by wire, wirelessly, or through the power/data transmitting coil 17 communicating with the power/data receiving coil 11. In FIG. 10C, the marker system 10 is self-contained, having its own source of power, power storage device 202, and an internal GPS receiver 203 for receiving the time value from the global positioning satellite for synchronization.

Although the power/data receiving coil 11 has been shown mounted on an outside surface of the bottom enclosure 28 of the marker system 10, it is equally anticipated that the power/data receiving coil 11 be located within the bottom enclosure 28 (e.g. molded in) or within the enclosure 16/28 of the marker system 10 (or any other location).

In the example shown, a marker system 10 is shown in a simple form, having a marker controller 206 that selectively illuminates one or more LEDs 208 and, optionally, receives indications from one or more light detecting elements 210 (e.g. interrogation requests). Operation and details of various marker systems 10 are detailed in the list of related patents included by reference (above).

Power to operate the marker controller 206 and LEDs 208 is derived either directly from the power/data receiver circuit 204 or from a power storage device 202 such as a rechargeable battery (removable or fixed), a super capacitor, etc. As battery management is often difficult, especially in field operations, the power/data receiver circuit 204 receives power from the power/data receiving coil 11 as the power/data transmitting coil 17 generates an electro-magnetic field responsive to the power/communications driver 104. This power is used to power the marker controller 206 and one or more LEDs 208 and/or to recharge the power storage device 202.

In embodiments in which the power/communications driver 104 also includes a data modulator that modulates information onto the power/data transmitting coil 17, that information is received by the power/data receiver circuit 204, demodulated by a data demodulator of the power/data receiver circuit 204, and transferred to the marker controller 206, for example, to adjust operation of the LEDs 208. In some embodiments, flashing of the one or more LEDs 208 is synchronized using a signal from one or more Global Positioning Satellites 240 (see FIGS. 11-15) by a GPS receiver 203/205. In embodiments in which the external GPS receiver 205 is external to the marker system 10, data from the GPS receiver is provided to the power/communications driver 104 that includes a data modulator. The data modulator modulates the data (e.g. time value) from the GPS receiver onto the power/data transmitting coil 17, which is then received by the power/data receiver circuit 204, demodulated by a data demodulator of the power/data receiver circuit 204, and transferred to the marker controller 206 where the data (e.g. time value) from the GPS receiver is used to synchronize flashing across multiple markers.

For example, if the flashing function selected by the user at 60 flashes per minute, the flash sequence will start at exactly the top of the next second and flash on for a fixed amount of time (e.g. ½ second) at the top of every subsequent second (e.g., 21:03.58:000, 21:03:59:000, 21:04:00:000, 21:04:01:000 . . . ). Neighboring helmet-mounted markers will also flash at these same times to synchronize with each other. In another example, the flashing function selected by the helmet-wearers is 30 flashes per minute, the flashes of all helmet-mounted markers start at the top of every other second of each minute (e.g., 21:03:58:00, 21:04:

00:000, 21:04:02:000, 21:04:04:000 . . . ), each flash lasting for a pre-programmed interval such as ½ second or 1 second.

Each Global Positioning Satellites 240 transmits signals that include various information. One part of the information transmitted by the Global Positioning Satellites 240 is known as "Ephemeris data" which contains important information such as status of the satellite (healthy or unhealthy), current date, and time (e.g., a time value). As multiple marker systems 10 receive this Ephemeris data, in particular, the time value, each of these multiple marker systems 10 synchronize flashing to the time portion of the Ephemeris data.

In FIG. 10A, the internal GPS receiver 203 is internal to the marker system 10, directly receiving the radio frequency signal transmitted by one or more Global Positioning Satellites 240, extracting the time value and the marker controller 206 synchronizes flashing using the time value.

In FIG. 10B, the external GPS receiver 205 is external to the marker system 10 and the external GPS receiver 205 communicates data (e.g. the time value) to the marker controller 206 either by a wired data connection, wirelessly (e.g. short-range wireless transmission by radio frequencies or light frequencies), or through the power/data transmitting coil 17 communicating with the power/data receiving coil 11. The external GPS receiver 205 receives the signal transmitted by one or more Global Positioning Satellites 240 and relays the signal to the marker controller 206 of the marker system 10, for example through the power/data transmitting coil 17 to the power/data receiving coil 11. The time value is used by the marker controller 206 to synchronize flashing of one or more of the LEDs 208.

In FIG. 10C, the marker system 10 is self-contained, having its own source of power, power storage device 202, and an internal GPS receiver 203 for receiving the signal (e.g. including the time value) from the global positioning satellite 240 for synchronization. The internal GPS receiver 203 receives the signal transmitted by one or more Global Positioning Satellites 240 and relays the signal (e.g. time value) directly to the marker controller 206 of the marker system 10. The time value is used by the marker controller 206 to synchronize flashing of one or more of the LEDs 208.

Figure 11:
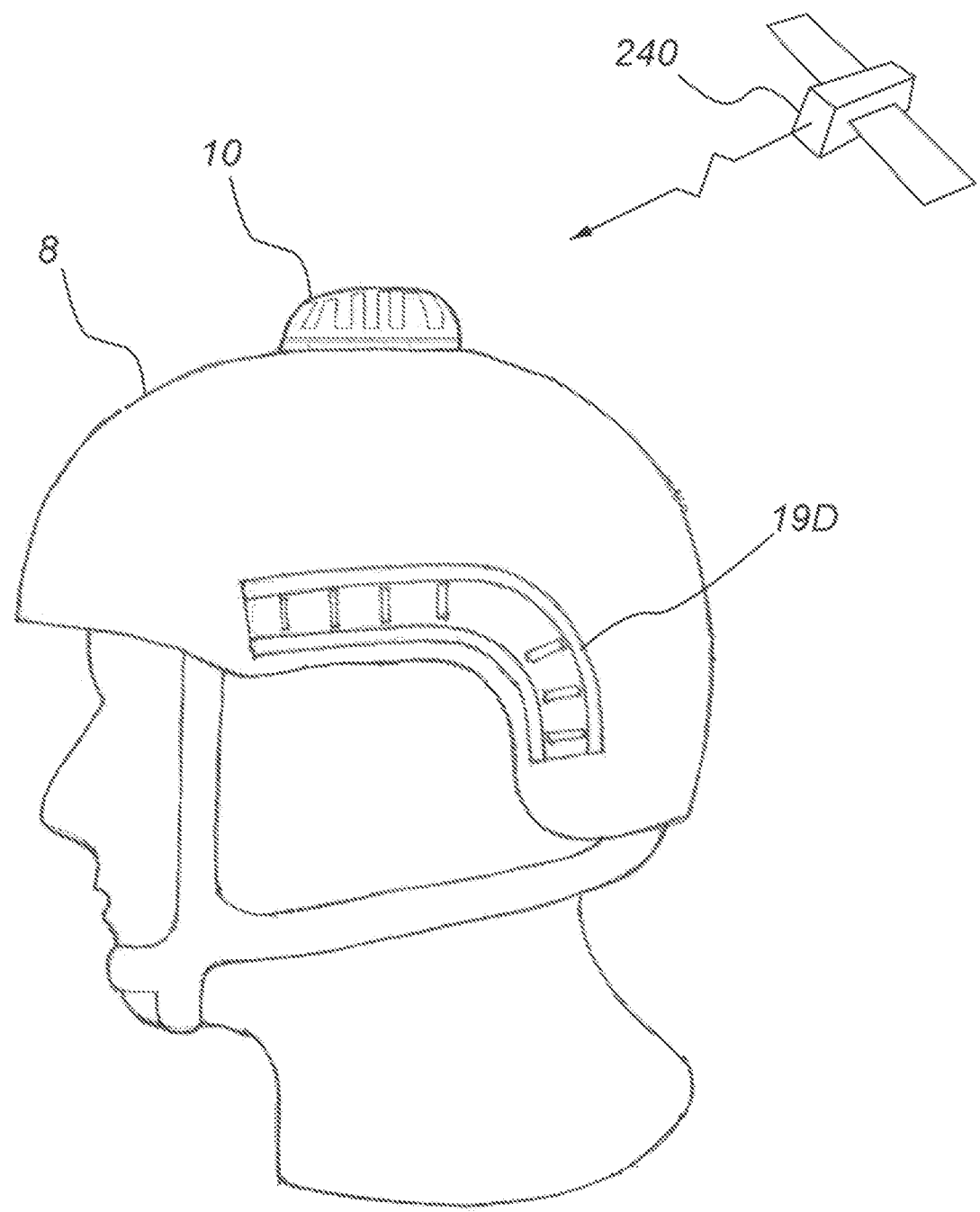
FIG. 11 illustrates a view of the helmet with a marker system deriving power/data from an internal power source and internally receiving and processing a time value signal from a GPS satellite.

FIG. 11 illustrates a view of the helmet 8 with a marker system 10 deriving power from a power storage device 202 and internally receiving a signal from a Global Positioning Satellites 240 (as shown in FIG. 10C). The power/data rail 19D is not used in this example.

In this example, the internal GPS receiver 203 is internal to the marker system 10, directly receiving the radio frequency signal transmitted by one or more Global Positioning Satellites 240 as shown in FIG. 10C and communicating with the marker controller 206 to synchronize flashing of the LEDs 208.

Figure 12:
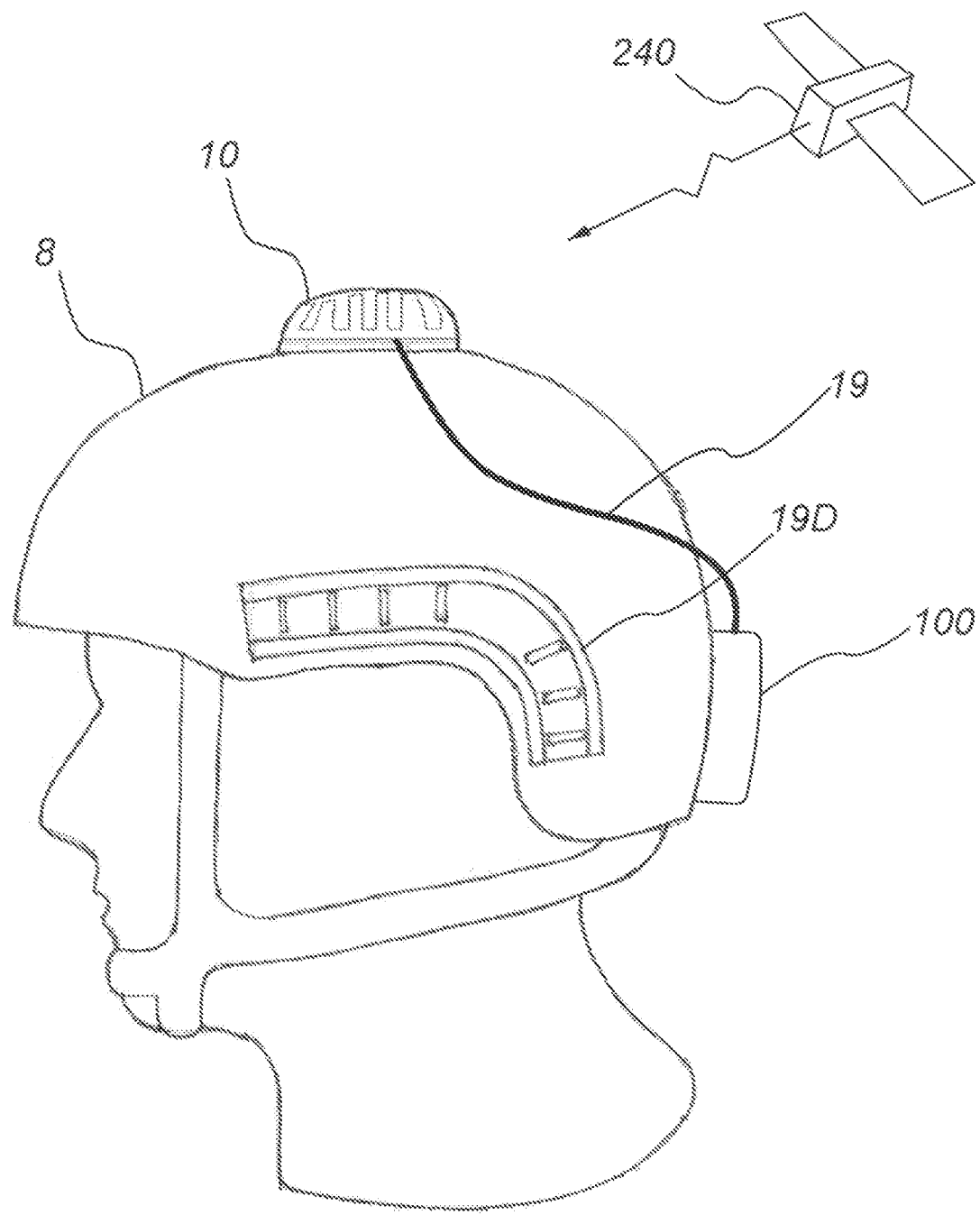
FIG. 12 illustrates a view of the helmet with a marker system deriving power from an external power source and internally receiving and processing a time value signal from a GPS satellite.

FIG. 12 illustrates a view of the helmet 8 with a marker system 10 deriving power from a power source 100 (external power supply) and internally receiving a signal from a Global Positioning Satellites 240 (as for example, in FIG. 10A).

In this example, the internal GPS receiver 203 is internal to the marker system 10, directly receiving the radio frequency signal transmitted by one or more Global Positioning Satellites 240 as shown in FIG. 10A.

Power is provided from a power source 100 through a power cable 19. The power source 100 is typically used to power other electronics mounted to the helmet 8 or external to the helmet 8. In this way, a single power source 100 provides power to multiple electronic devices, including the marker system 10, simplifying battery management to making sure one single power source 100 is fresh or fully recharged. In some embodiments, the power cable 19 directly connects to the marker system 10 while in some embodiments, the power from the power cable 19 is used to drive the power/data transmitting coil 17, transmitting power and/or data to the power/data receiving coil 11 on or in the marker system 10.

Figure 13:
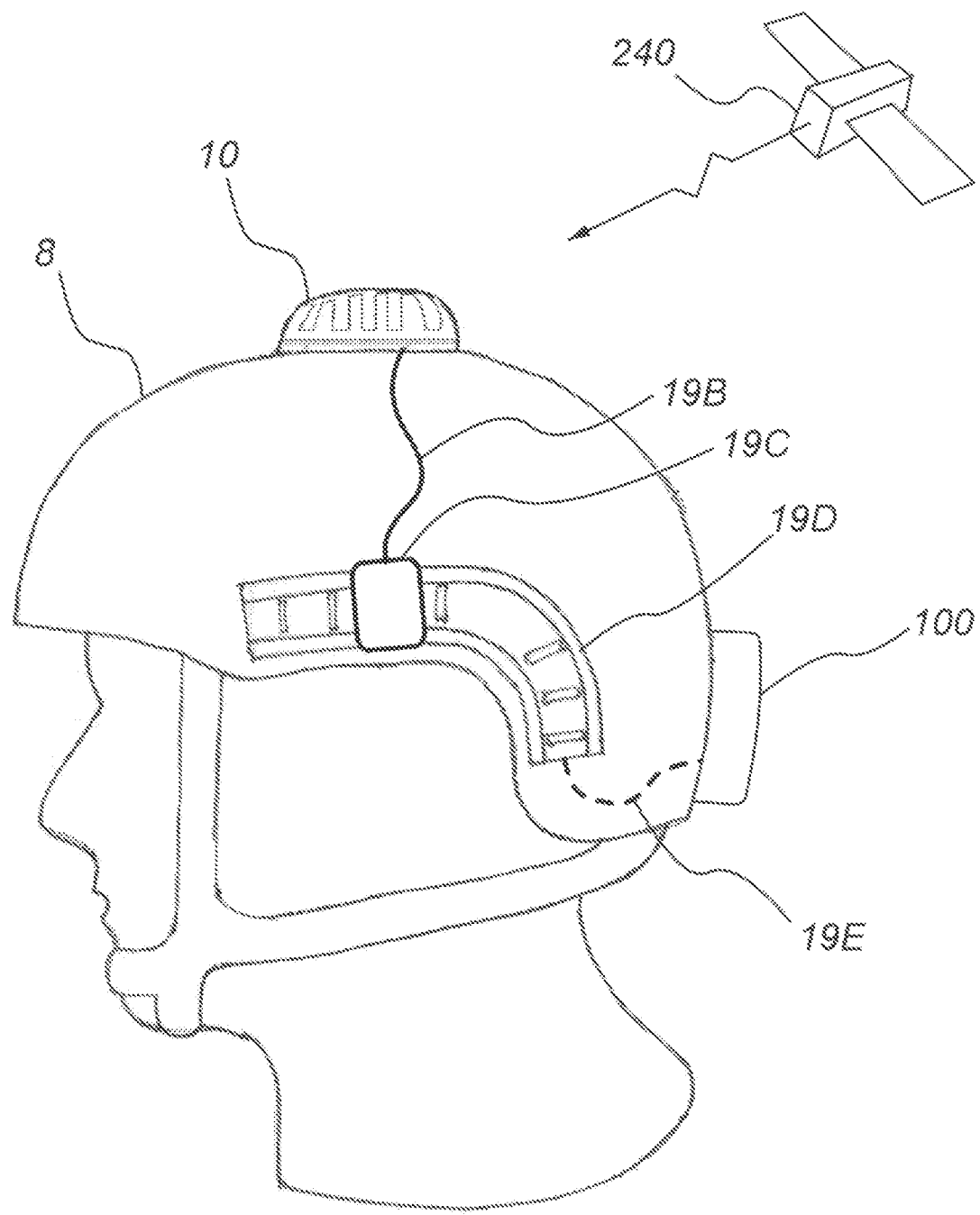
FIG. 13 illustrates a view of the helmet with a marker system deriving power from an external power source through a power/data rail and internally receiving and processing a time value signal from a GPS satellite.

FIG. 13 illustrates a view of the helmet 8 with a marker system 10 deriving power from a power source 100 through a power/data rail 19D and internally receiving a radio frequency signal from one or more Global Positioning Satellites 240.

In this example, the internal GPS receiver 203 is internal to the marker system 10, directly receiving the radio frequency signal transmitted by one or more Global Positioning Satellites 240 as shown in FIG. 10A.

Power and/or data is provided from a power source 100 through a power cable 19E that connects to a power/data rail 19D. A connector 19C on the power rail provides power to a power/data cable 19B. The power source 100 is typically used to power other electronics mounted to the helmet 8 or external to the helmet 8 through the power/data rail 19D. In this way, a single power source 100 provides power to multiple electronic devices, including the marker system 10, simplifying battery management to making sure one single power source 100 is fresh or fully recharged. In some embodiments, the power/data cable 19B directly connects to the marker system 10 while in some embodiments, the power from the power/data cable 19B is used to drive the power/data transmitting coil 17, transmitting power to the power/data receiving coil 11 on or in the marker system 10.

Figure 14:
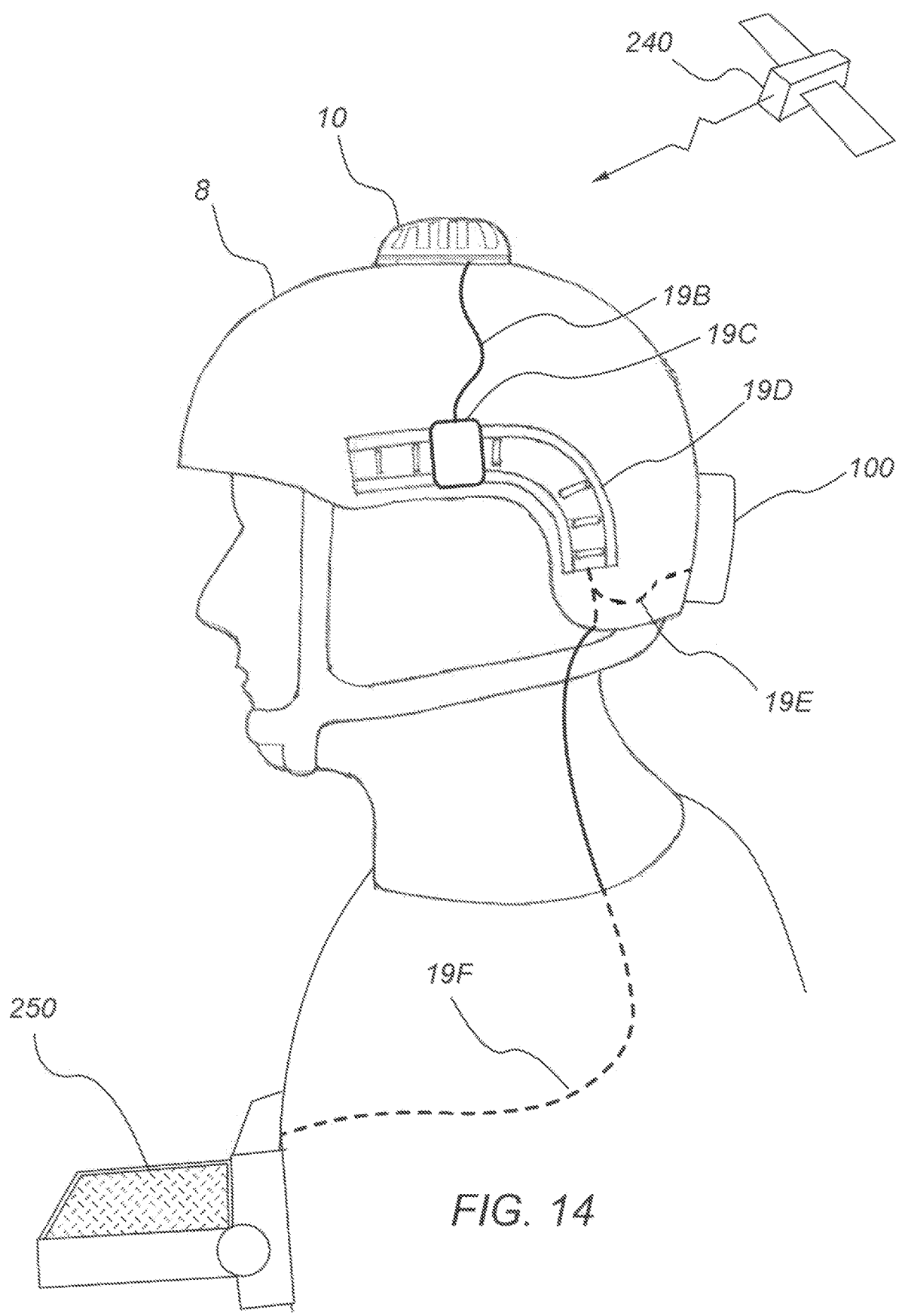
FIG. 14 illustrates a view of the helmet with a marker system deriving power from an external power source and receiving and processing a time value signal from an external GPS receiver mounted in an external tactical computer through a power/data rail.

FIG. 14 illustrates a view of the helmet 8 with a marker system 10 deriving power from a power source 100 and receiving a radio frequency signal from an external GPS receiver through a power cable 19E.

In this example, the external GPS receiver 205 is external to the marker system 10, located in, for example, a tactical computer 250 that includes a receiver for directly receiving the radio frequency signal transmitted by one or more Global Positioning Satellites 240 as shown in FIG. 10B. The signal from the receiver is relayed through a signal or signal/power cable 19F to the power/data rail 19D, then through the connector 19C and power/data cable 19B to the marker system 10, where the signal is used in timing of light flashes from the marker system 10.

Power is provided from a power source 100 through a power cable 19E that connects to a power/data rail 19D. A connector 19C on the power/data rail provides power/data to a power/data cable 19B.

The power source 100 is typically used to power other electronics mounted to the helmet 8 or external to the helmet 8 through the power/data rail 19D. In this way, a single power source 100 provides power to multiple electronic devices, including the marker system 10, simplifying battery management to making sure one single power source 100 is fresh or fully recharged. In some embodiments, the power/data cable 19B directly connects to the marker system 10 while in some embodiments, the power from the power/data cable 19B is used to drive the power/data transmitting coil 17, transmitting power to the power/data receiving coil 11 on or in the marker system 10.

Figure 15:
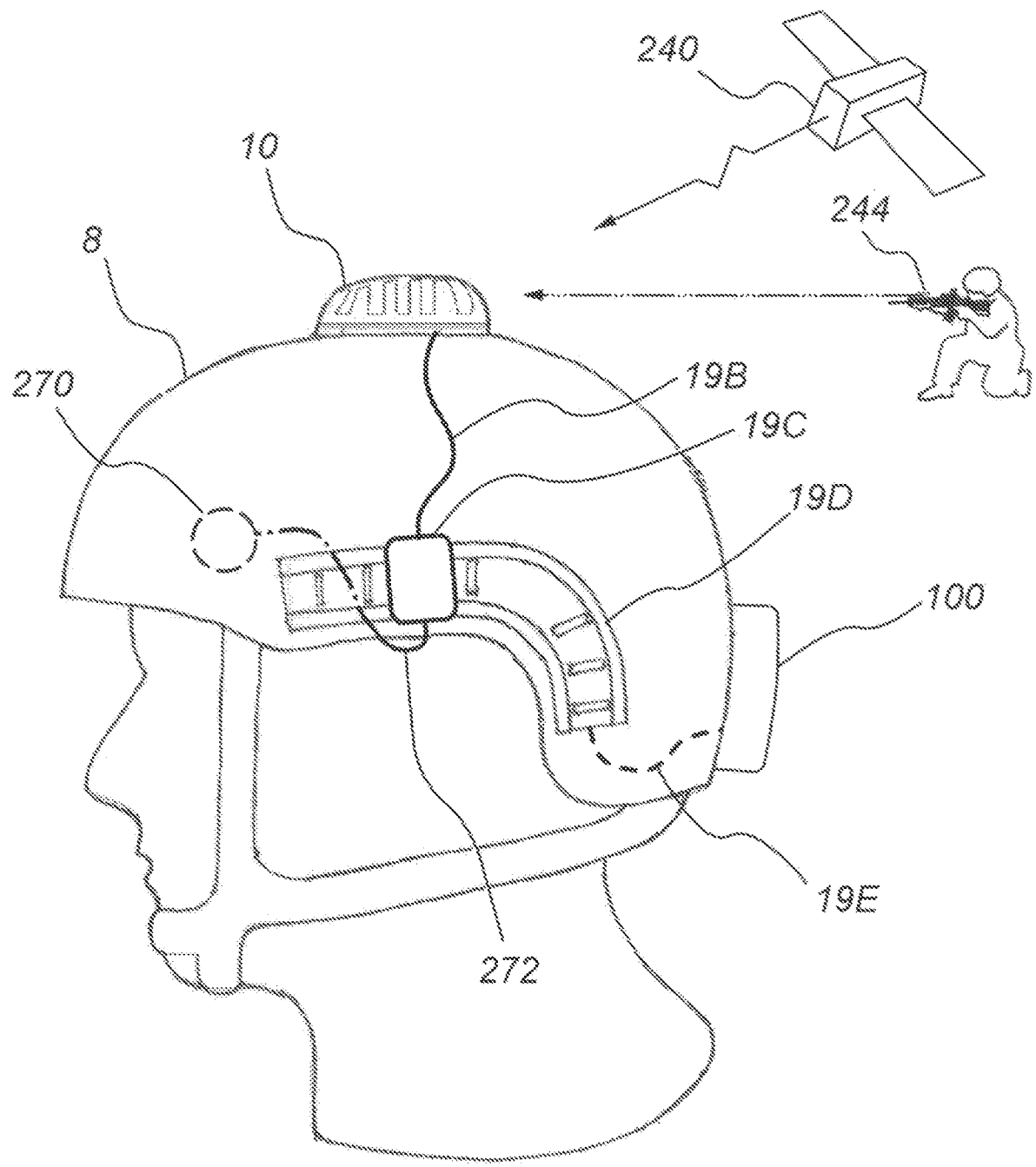
FIG. 15 illustrates a view of the helmet with a marker system deriving power from an external power source through a power/data rail, internally receiving and processing a time value signal from a GPS satellite, and signaling friend/foe to a friendly combatant subjected to IFF laser interrogation by friendly combatant via an infrared laser.

FIG. 15 illustrates a view of the helmet with a marker system deriving power from a power source 100 through a power rail, internally receiving a radio frequency signal from a Global Positioning Satellites 240, and signaling friend/foe to a friendly combatant 244.

In this example, the internal GPS receiver 203 is internal to the marker system 10, directly receiving the radio frequency signal transmitted by one or more Global Positioning Satellites 240 as shown in FIG. 10A.

Power is provided from a power source 100 through a power cable 19E that connects to a power/data rail 19D. A connector 19C on the power rail provides power/data to a power/data cable 19B. The power source 100 is typically used to power other electronics mounted to the helmet 8 or external to the helmet 8 through the power/data rail 19D. In this way, a single power source 100 provides power to multiple electronic devices, including the marker system 10, simplifying battery management to making sure one single power source 100 is fresh or fully recharged. In some embodiments, the power/data cable 19B directly connects to the marker system 10 while in some embodiments, the power and/or data from the power/data cable 19B is used to drive the power/data transmitting coil 17, transmitting power to the power/data receiving coil 11 on or in the marker system 10.

When the friendly combatant 244 issues a friend/foe signal (e.g. an infrared encoded signal from their weapon-mounted laser), all marker systems 10 of other friendly combatants receive and recognize the friend/foe signal and create a response that make the friendly combatant 244 aware the other friendly combatants are, indeed, friendly (e.g., each marker system 10 of other friendly combatants emit a flashing signal of a known pattern). The mechanisms described above are used to synchronize the flashing of all marker systems 10 of other friendly combatants. Otherwise, in some situations, multiple marker systems 10 flashing randomly (not synchronized) are able to confuse the friendly combatant 244 and, in some situations, instead of providing an indication that the other combatants are friendly, will result in fratricide if the random flashes are misinterpreted by the friendly combatant 244 as enemy muzzle flashes.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A marker system comprising:
   a controller;
   a plurality of emitters electrically interfaced to the controller such that, upon the controller initiating a flow of electric current though one or more of the emitters, the one or more of the emitters emit light;
   at least one detector electrically interfaced to the controller, the at least one detector for detecting light in of a specific wavelength and converting the light to an electrical signal that is received by the controller;
   a radio frequency receiver interfaced to the controller, the radio frequency receiver receives a radio frequency signal from one or more global positioning satellites and decodes a time value from the radio frequency signal; and
   the controller selectively initiates the flow of electric current through a selected set of the plurality of emitters synchronized to the time value.

2. The marker system of claim 1, wherein the radio frequency receiver is housed within the marker system.

3. The marker system of claim 1, wherein the radio frequency receiver is housed external to the marker system and the radio frequency signal is passed into the marker system and connected to the controller.

4. The marker system of claim 1, wherein the radio frequency receiver is housed external to the marker system and the time value is passed into the marker system and connected to the controller.

5. The marker system of claim 3, wherein the radio frequency receiver is housed external to the marker system and the signal is modulated into a modulated signal that drives a power/data transmitting coil, a power/data receiving coil of the marker system receives the modulated signal and the signal is extracted from the modulated signal and the signal is presented to the controller whereby the controller selectively initiates the flow of electric current through the selected set of the plurality of emitters synchronized to the time value.

6. The marker system of claim 5, wherein the modulated signal further provides power through the power/data transmitting coil, received by the power/data receiving coil of the marker system.

7. A method of synchronizing flashing of a plurality of marker systems, the method comprising:
   each marker system of the plurality of marker systems receiving a signal from at least one global positioning satellite, the signal comprising a time value;
   when initiating illumination of at least one light emitting device of the each marker system, synchronizing the initiating illumination to the time value.

8. The method of claim 7, wherein the step of receiving of the signal is performed within the each marker system.

9. The method of claim 7, wherein the step of receiving of the signal is performed external to the each marker system.

10. The method of claim 9, further comprising modulating the signal onto a power/data transmitting coil external to the marker system and demodulating the signal from a power/data receiving coil of the marker system.

11. A marker system comprising:
   a housing, the housing having at least one translucent or transparent surface;
   a controller mounted within the housing;
   a plurality of emitters mounted within the housing and electrically interfaced to the controller such that, upon the controller initiating a flow of electric current though one or more of the emitters, the one or more of the emitters emit light and the light passes through the at least one translucent or transparent surface;
   at least one detector electrically interfaced to the controller, the at least one detector for detecting light in of a specific wavelength and converting the light to an electrical signal that is received by the controller;
   a radio frequency receiver interfaced to the controller, the radio frequency receiver receives a radio frequency signal from one or more global positioning satellites and decodes a time value from the radio frequency signal; and
   software stored in a non-transitory storage associated with the controller, the software initiating the flow of electric current through a selected set of the plurality of emitters synchronized to the time value.

12. The marker system of claim 11, wherein the radio frequency receiver is housed within the housing.

13. The marker system of claim 11, wherein the radio frequency receiver is housed external to the housing and the radio frequency signal is passed into the marker system and is connected to the controller.

14. The marker system of claim 11, wherein the radio frequency receiver is housed external to the housing and the time value is passed into the housing and to the controller.

15. The marker system of claim 11, wherein the radio frequency receiver is housed external to the housing and the signal is modulated into a modulated signal that drives a power/data transmitting coil, a power/data receiving coil of the marker system receives the modulated signal and the signal is extracted from the modulated signal and the signal is presented to the controller for synchronization.

16. The marker system of claim 15, wherein the modulated signal further provides power to the marker system.

\* \* \* \* \*